United States Patent Office 3,555,666
Patented Jan. 19, 1971

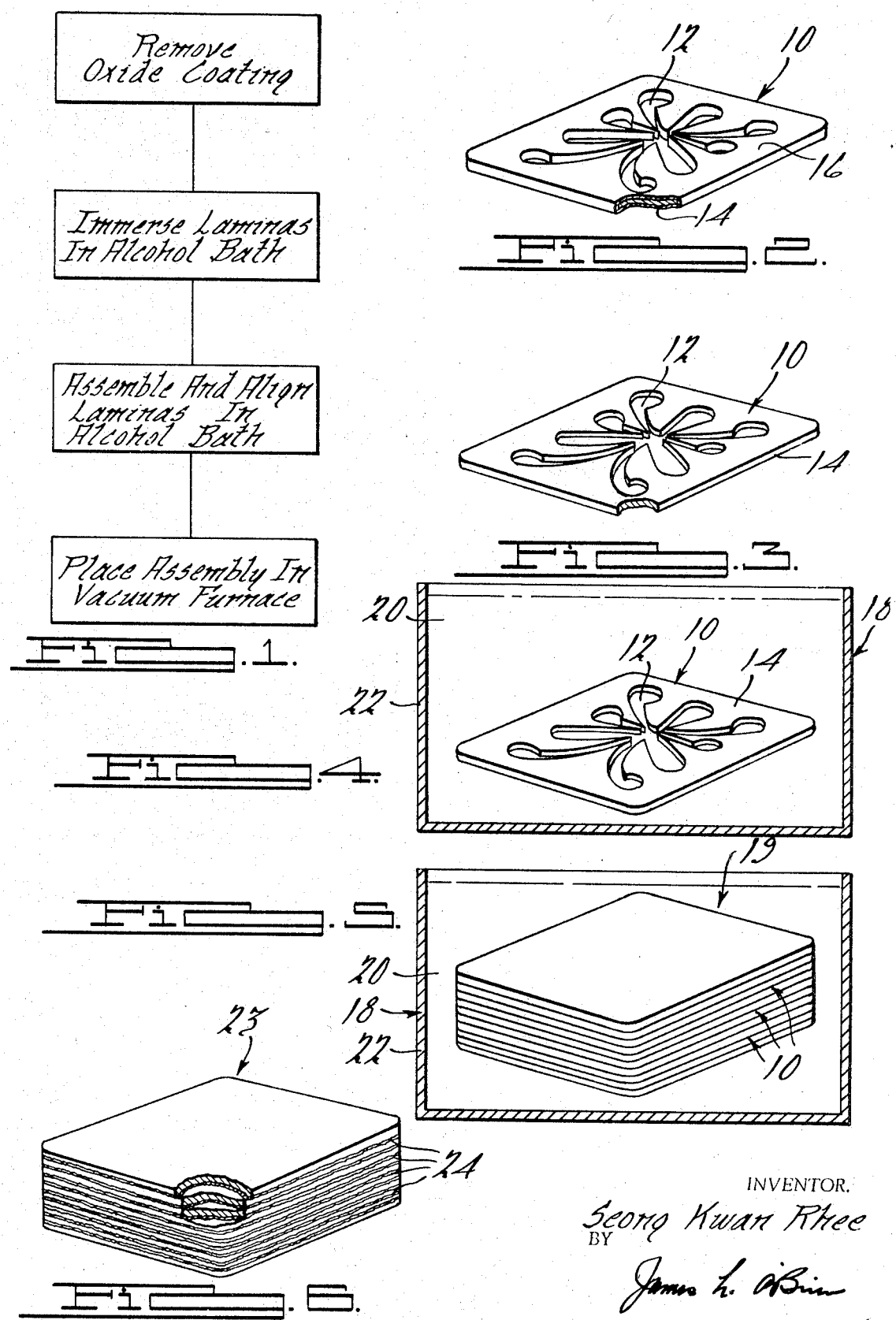

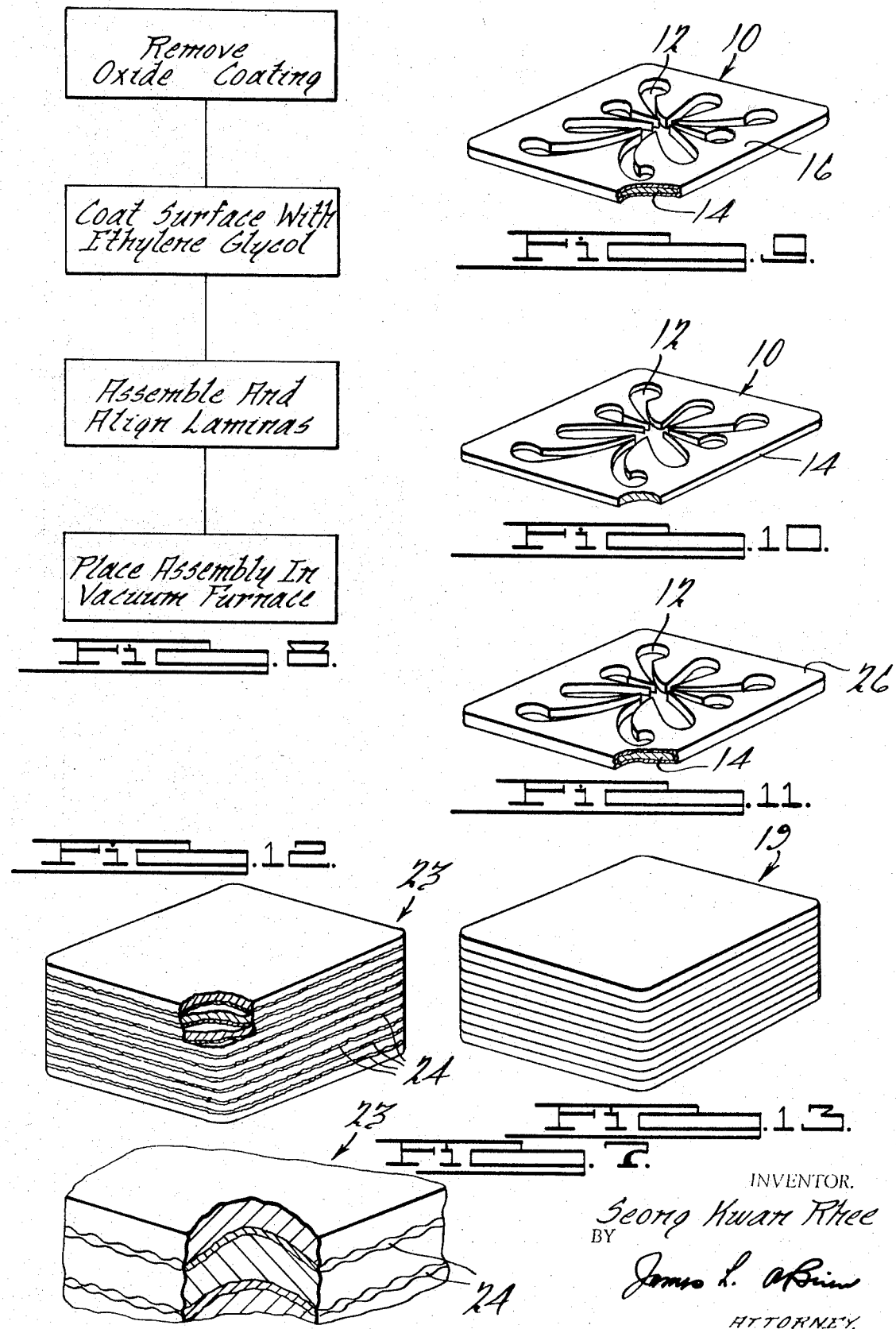

3,555,666
METHOD OF DIFFUSION BONDING OF METALS
Seong Kwan Rhee, Livonia, Mich., assignor to The Bendix Corporation, a corporation of Delaware
Filed Jan. 25, 1968, Ser. No. 700,539
Int. Cl. B23k *1/20, 31/02*
U.S. Cl. 29—488    14 Claims

ABSTRACT OF THE DISCLOSURE

A method for solid state diffusion bonding of two bodies of metal such as the laminas of a fluidic device wherein the surfaces are prepared by removing the surface oxides and then covered with a self-removable substance having a low solubility of oxygen and a low diffusion rate of oxygen such as alcohols, glycerine, glycols, polybutenes, acrylic resins, lacquers and polystyrenes to prevent oxidation of the surfaces. While the surfaces are still covered by this oxidation-preventing substance, the bodies of metal are assembled and placed in a vacuum furnace for bonding.

BACKGROUND OF THE INVENTION (1) Field of the invention

A method of joining two bodies of metal through solid state diffusion and more particularly a method of joining laminate sections of a fluidic device through solid state diffusion.

(2) Description of the prior art

The applications for fluidic components have increased to the extent that mass production of these components is being undertaken. A particularly advantageous method of mass producing a fluidic device has been to form fluid passageways into individual laminas in a manner such that a plurality of laminas may be stacked and aligned to provide a fluidic device. The laminas are generally constructed of metallic foil or sheet stock material which may be 0.0005 to 0.030 inch in thickness. The passageways may be formed by photoetching, stamping or other suitable methods. In some complex fluidic devices, exteremely intricate patterns are formed in the laminas. Considering a typical lamina of 0.003 inch in thickness having an intricate pattern, it can be appreciated that the lamina may be easily deformed through slight abuses in handling.

In the manufacture of the laminated fluidic devices, it is necessary to bond the laminas together in precise, fluid-tight engagement so as to provide unrestricted flow passages and prevent spurious interactions caused by cross leaks between the passageways. Of the suggested methods for bonding the laminas together which include welding, brazing, gluing, soldering and diffusion bonding, the latter appears to be the most promising. Other suggested methods are unsuitable since there is an overflow of the bonding medium at the interface of the mated laminas which projects into the flow passages. These problems are not presented when the laminas are bonded by solid state diffusion. (Futhermore, the bonding medium introduces a dissimilar metal to the interface region which may result in substantial corrosion.)

In attempting to develop methods for bonding laminated fluidic devices through a diffusion bonding technique, a formidable problem was encountered. The individual laminas were found to have an oxide coating on the base material which had been formed by reaction with oxygen in the atmosphere. The oxide coating served as a barrier to the diffusion of atoms of the base metal into the mated surface thereby prevented the formation of a bonding alloy between the mating surfaces. Moreover, the oxide was immediately reformed on the surfaces after its removal. Methods are known for removing the oxide coating and also methods are known for keeping the surfaces oxide-free until bonding. These latter methods generally use a chamber for providing an inert gas or a vacuum environment to prevent oxidation of the metals until the bond has been accomplished. Although those methods are generally successful, the associated equipment for maintaining such an environment and handling the parts therein tends to be bulky and expensive. The problem of obtaining suitable in-chamber handling equipment is particularly acute in the case of fluidic devices since the delicate laminas may be easily deformed if mishandled during assembly in the chamber. Furthermore, the assembly operation is an exacting one since the laminas must be precisely aligned to prevent interferences with the flow patterns within the device. Because of these difficulties, a high cost of manufacturing equipment and a high rate of manufacturing defects is entailed.

SUMMARY OF THE INVENTION

The present invention provides a novel method of diffusion bonding of metals. More particularly, the present invention provides a method, particularly useful in the manufacture of fluidic devices, for preventing the formation of new oxides after the removal of the original oxide coating without the use of an inert gas or a vacuum chamber. The method may be used even in the case of metals that form oxide coatings which are non-reducible, or difficult to reduce. According to this method, the formation of new oxides is prevented until such time that solid state diffusion bonding occurs by covering the freshly deoxidized surfaces with a substance which will prevent the introduction of oxygen to the surfaces to be joined until they are bonded together. More particularly, this substance must be characterized by having a low solubility of oxygen, being chemically inert with respect to the bodies and being capable of preventing diffusion of oxygen to the surface. Furthermore, the substance must have a vapor pressure which is high enough to provide complete evaporation in a bonding environment to expose the oxide-free surfaces for bonding. For example, some of the substances having these characteristics are alcohols, glycerine, glycols, polybutenes, acrylic resins, lacquers and polystyrenes. The first four examples are liquids whereas the latter three are solids. Depending upon the particular object being bonded, a liquid or a solid substance may be more desirable.

Using the assembly of a laminated fluidic device as an example, a complete method according to this invention would include the steps of: removing the oxides from the surfaces of the laminates, covering the surface with a substance having a characteristic described above, assembling and aligning the laminates to place the covered surfaces in mating engagement, and subjecting the assembly to an elevated temperature environment or a neutral gas or vacuum environment, or both, to allow complete vaporization of the substance and intimate contact of the mated surfaces thereby providing for solid state diffusion bonding of the mated surfaces. More particularly, the surfaces may be covered with a substance as described above until bonding by the following methods: (a) The laminas may be immersed in a bath of the substance, alcohol for example, and the fluidic device assembled while immersed in the bath. (b) If it is preferred to assemble the device outside of the bath, a coating substance may be chosen, for example, ethylene glycol, which adheres to the laminas to form a coating which persists when the laminas are removed from the bath and has a sufficiently low vapor pressure to prevent its removal through evaporation until the laminas are assembled and placed in a bonding environment.

BRIEF DESCRIPTION OF THE DRAWINGS

FIG. 1 is a block diagram illustrating the method of this invention.

FIGS. 2–7 illustrate the manufacture of a laminate fluidic device corresponding to the method of FIG. 1.

FIG. 8 is a block diagram of another method according to this invention.

FIGS. 9–13 illustrate the manufacture of a laminated fluidic device according to the method of FIG. 8.

DETAILED DESCRIPTION OF THE PREFERRED EMBODIMENTS

In FIG. 1 a method according to the present invention is illustrated. The method of FIG. 1 will be described with reference to FIGS. 2–6 in which the manufacture of a laminate fluidic device according to the method is illustrated.

In FIG. 2 an individual lamina 10 having a flow passage pattern 12 therein is shown. The lamina 10 is comprised of a body of a base metal 14 which may be of any metal capable of bonding with a mating body of metal through solid state diffusion through continuous surfaces of the bodies. It should be understood that not only metals which form reducible oxides, but even metals that form oxide coatings that are non-reducible or difficult to reduce may be used. Some metals of the latter category are aluminum, beryllium, chromium, titanium and alloys based on these metals. Further examples are ferrous alloys including stainless steel; super alloys based on iron, cobalt, or nickel; and refractory alloys based on chromium, molybdenum, tungsten, niobium, tantalum, manganese, vanadium and zirconium. Still further examples are those alloys based on metals, which may be other than those listed above, that form an oxide coating which is non-reducible or difficult to reduce by virtue of alloying ingredients such as aluminum, magnesium, silicon, titanium, chromium, cobalt, nickel, yttrium, cerium, thorium and zirconium. These examples of metals given above are not only capable of bonding to another body of the same metal, but also to bodies of any of the above metals. The lamina 10 has an oxide coating 16 which was formed by exposure of the base metal 14 to the oxygen in the atmosphere.

In the first step in the method of FIG. 1, the oxide coating 16 is removed from the surface of the lamina 10 by conventional techniques. This may be accomplished by initially degreasing the surfaces in trichlorethylene and removing the trichloroethylene with alcohol. The alcohol may then be removed by rinsing with distilled water. Thereafter, the oxide coating is removed by either a sodium hydroxide or potassium hydroxide solution. The oxide-free parts are then neutralized in an acid solution which may be hydrochloric acid for 5052 aluminum alloy (aluminum with 2.5% magnesium and 0.25% chromium), dilute nitric acid solution for 2024 aluminum alloy (aluminum with 4.5% copper, 1.5% magnesium and 0.6% manganese) or a solution of hydrofluoric acid and dilute nitric acid for 355 aluminum alloy (aluminum with 5% silicone, 1.3% copper and 0.5% magnesium). The acid solution is then removed by rinsing with distilled water and finally the distilled water is removed with alcohol. The surfaces, when prepared in the above manner, will be clean and oxide-free. The results of this step can be seen in FIG. 3 in which an individual lamina is shown with the oxide coating removed.

In the second step of the method, the oxide-free surfaces are immediately immersed in a bath 18 of alcohol 20. It is important that the lamina having oxide-free surfaces is immersed in the alcohol bath 18 without delay. Otherwise, the alcohol will evaporate and, as a result, an oxide layer will form which will prevent diffusion bonding of the lamina. The alcohol 20 may be substituted for by any substance which has a low solubility of oxygen, is capable of preventing diffusion of oxygen to the surface, is chemically inert with respect to the metals such that the metals are not chemically altered from their original composition and has a vapor pressure which is high enough to provide complete evaporation substantially without residue in a bonding environment. Alcohol has been used successfully with this method and is readily available and inexpensive.

In the next step which is illustrated in FIG. 5, the individual laminas 10 are assembled while immersed in the alcohol bath 18. In this step, the laminas 10 are precisely aligned and then maintained in alignment through a jig or fixture (not shown), preferably one which places the assembly 19 under a clamping pressure. The bath container 22 may be constructed with one or more transparent walls to facilitate the assembly and alignment operation.

After assembly and alignment, the assembly 19 is removed from the bath 18 and immediately placed in a vacuum furnace (not shown) for bonding. It is preferred to use a vacuum furnace. However, a furnace using a neutral or reducing atmosphere may also be used. The temperature and pressure of the vacuum furnace and the amount of time required for bonding are generally determined empirically. In the bonding of 5052 aluminum, two hours at 1030° F. in a $10^{-4}$ mm. Hg vacuum provided a satisfactory bond. With 2024 aluminum, five hours at 880° F. in a $10^{-4}$ mm. Hg vacuum was satisfactory. During the period in which the assembly 19 is in the vacuum furnace, the alcohol 18 fully evaporates thereby allowing intimate contact of the oxide-free surfaces and diffusion of atoms of the base metal 14 into interface areas of the laminas to form a bonding alloy 24 at the interfaces of the lamina as shown generally in FIG. 6 and in detail in FIG. 7. The bonded assembly 19 has been found to be suitably strong for operation of the fluidic device under a variety of conditions. Furthermore, there is negligible upset at the interface of the lamina 10 thereby providing accurate flow passages for the fluid. Since the temperatures required for solid state diffusion bonding are less than those required for welding, there is a minimum of distortion of the assembly 19 and therefore a high degree of performance uniformity among fluidic devices manufactured by this method.

In some instances, it is desired to assemble and align the fluidic device while outside of the bath 18. In these instances, a second method according to this invention, shown in FIG. 7, may be practiced. Since the manufacture of a laminated fluidic device is identical to that described with respect to the method of FIG. 1 disclosed herein, like numerals have been used to indicate like components.

The first step of the second method is the same as the first step of the previously described method. In that step, the oxide coating 16 on the lamina 10 shown in FIG. 8 is removed to provide a lamina 10 being free of oxides on its surfaces as shown in FIG. 9.

In the second step, the laminas 10 are coated with an adhering substance 26 as shown in FIG. 10 which will prevent oxidation of the surfaces until the surfaces are bonded. More particularly, the substance 26 must have the same characteristics as those of the bath substance 20 of the previously described method, that is, it must have a low solubility of oxygen, be capable of preventing diffusion of oxygen to the surfaces, be chemically inert with respect to the metals and have a vapor pressure which is high enough to provide complete evaporation substantially without residue in a bonding environment. In addition to those characteristics, the substance 26 must be capable of adhering to the surfaces and must have a vapor pressure which is low enough to prevent removal of the substance 26 through evaporation under normal environmental conditions for a period of time until the parts are bonded. These latter two characteristics are necessary so that the laminas 10, once coated, can be assembled in the atmosphere without encountering oxidation of the surfaces. For example, some of the substances 26 having all of the above characteristics are glycerine, glycols, polybutenes, acrylic resins, lacquers and polystyrenes. The first three examples are liquids whereas the latter three are solids. In some circumstances, particularly when there is a long time period between the deoxidation of the surfaces and the bonding operation, a solid substance 26 may be more desirable. Also, if the laminas 10 will be subject to some abuse in this period, a solid substance 26 is preferred. The laminas 10 may be coated by immersion in a bath, spraying, brushing or any other suitable method.

After coating with the substance 26, the laminas 10 may be assembled and aligned in the atmosphere as shown in FIG. 11. Thereafter, the assembly 19 is subjected to a bonding environment, preferably a high temperature vacuum environment as supplied by a vacuum furnace. It is preferred to first establish a vacuum in the furnace and then raise the temperature therein to a predetermined intermediate temperature which is sufficient to cause rapid evaporation of the substance without boiling or severe decomposition. Boiling tends to separate the laminas and may cause local deformation. Severe decomposition may cause charring or may produce a new compound, either of which could result in a residue between the laminas which will prevent diffusion bonding. In many furnaces there is an inherent time lag in elevating the temperature which permits evaporation without boiling or severe decomposition during the period in which the temperature is being elevated to the temperature at which bonding occurs. While in the bonding environment, the liquids are removed through evaporation. The solids, on the other hand, depolymerize to form a compound having a high vapor pressure and thereafter evaporate. Accordingly, the solids have an effective vapor pressure which is quite high when they are subjected to an elevated temperature environment. After evaporation of the coating 26, the oxide-free surfaces will be in intimate contact thereby resulting in solid-state diffusion bonding of the assembly 19. The final product 23, as shown in FIG. 12, consists of the laminas 10 joined at their interface by an alloy 24 caused by diffusion of the atoms of the lamina into the interface region.

The method according to this invention is economical and uses readily available materials. Furthermore, persons may be trained to practice this method within a relatively short time and a manufacturing facility may be constructed at low cost. For these reasons, this method is believed to be a significant step in the art.

Although this invention has been disclosed and illustrated with reference to a particular bonding application, the principles involved are susceptible to numerous other bonding applications which will be apparent to persons skilled in the art. The invention is therefore to be limited only as indicated by the scope of the appended claims.

Having thus described my invention, I claim:

1. A method of joinning two bodies of metal capable of being bonded by solid state diffusion through contiguous surfaces of the two bodies comprising the steps of:
    preparing the surfaces which are to be bonded by removing surface oxides which would act as a barrier to bonding;
    covering the oxide-free surfaces with a substance characterized by being capable of preventing the diffusion of oxygen to the surfaces, by having a predetermined low solubility of oxygen, by being chemically inert with respect to the bodies, and by having a predetermined vapor pressure high enough to provide complete evaporation substantially without residue when subjected to a bonding environment involving elevated temperature and at least one of the environmental conditions of reduced pressure, neutral atmosphere and reducing atmosphere;
    mating the substance covered surfaces, under a clamping pressure not to exceed a pressure which would cause deformation of the bodies; and
    placing the mated surfaces in a chamber wherein said bonding environment is maintained for a predetermined time period sufficient to provide for the complete vaporization of said substance and solid state diffusion bonding of said bodies.

2. The method of claim 1 wherein said surfaces are covered by immersing said surfaces in a bath of said substance and said surfaces are mated while immersed in said bath.

3. The method of claim 2 wherein said substance is an alcohol.

4. The method of claim 1 wherein said substance is further characterized by being capable of adhering to the surfaces and wherein said predetermined vapor pressure is low enough to prevent removal of the substance through vaporization under normal atmospheric conditions for a predetermined time period such that said surfaces may be mated in the atmosphere without oxidation of said surface.

5. The method of claim 4 wherein said substance is a solid which depolymerizes when subjected to an elevated temperature environment thereby increasing the vapor pressure of said substance.

6. The method of claim 4 wherein said substance is selected from the group consisting of glycerine, glycols, polybutenes, acrylic resins, lacquers and polystyrenes.

7. The method of claim 1 wherein said metals are selected from the group consisting of beryllium, magnesium, aluminum, titanium, iron, cobalt, nickel, chromium, molybdenum, tungsten, niobium, tantalum, manganese, vanadium, zirconium and their alloys.

8. The method of claim 1 wherein said metals have at least one alloying ingredient selected from the group consisting of aluminum, magnesium, silicon, titanium, chromium, cobalt, nickel, yttrium, cerium, thorium and zirconium.

9. The method of claim 1 further including the step of subjecting the surfaces after mating to a predetermined clamping pressure.

10. The method of claim 1 wherein said mated surfaces are placed in a vacuum furnace in which the pressure is reduced and the temperature is elevated to provide for diffusion bonding of said bodies.

11. The method of claim 9 wherein the temperature within said vacuum furnace is first elevated to an intermediate temperature which provides for rapid evaporization of said substance without boiling or severe decomposition thereof and thereafter the temperature is further elevated to a bonding temperature which provides for diffusion bonding of said bodies.

12. The method of claim 1 wherein said mated surfaces are placed in a furnace in which a neutral atmosphere is provided.

13. The method of claim 1 wherein said mated surfaces are placed in a furnace in which a reducing atmosphere is provided.

14. The method of claim 1 wherein said metal bodies are comprised essentially of aluminum and the step of preparing the surfaces comprises the steps of:
    removing surface oxides by immersing the metal bodies in an hydroxide solution;

neutralizing the hydroxide by immersing the metal bodies in an acid solution;
rinsing the metal bodies in water; and
removing the water in an alcohol solution.

References Cited

UNITED STATES PATENTS

| | | | |
|---|---|---|---|
| 2,092,191 | 9/1937 | Thomas | 29—495X |
| 2,907,104 | 10/1959 | Brown et al. | 29—495X |
| 2,996,798 | 8/1961 | Cohen et al. | 29—498X |
| 3,436,278 | 4/1969 | Poliak | 29—495X |
| 3,441,996 | 5/1969 | Boothe | 29—495X |
| 3,451,114 | 6/1969 | Werneke | 29—495X |

OTHER REFERENCES

Welding Kaiser Aluminum, 1st edition, copyright 1967, pp. 11–12 to 11–15 and 18–6 to 18–8.

JOHN F. CAMPBELL, Primary Examiner

R. J. SHORE, Assistant Examiner

U.S. Cl. X.R.

29—498; 117—6